United States Patent
Scheffel

[11] 4,025,759
[45] May 24, 1977

| | | | |
|---|---|---|---|
| 3,846,622 | 11/1974 | Meyer | 235/61.7 B |
| 3,919,447 | 11/1975 | Kilmer | 235/61.11 E |

*Primary Examiner*—Robert M. Kilgore
*Attorney, Agent, or Firm*—Gordon W. Hueschen

[54] CHECKING APPARATUS FOR DOCUMENTS
[75] Inventor: Kurt M. Scheffel, Weil am Rhine, Germany
[73] Assignee: The Grey Lab. Establishment, Liechtenstein
[22] Filed: Oct. 16, 1975
[21] Appl. No.: 622,868
[52] U.S. Cl. .................. 235/61.7 B; 235/61.11 E; 235/61.12 N; 283/7; 340/149 A
[51] Int. Cl.² .................. G06K 7/10; B42D 15/00; G06K 19/06
[58] Field of Search ............... 235/61.7 B, 61.7 R, 235/61.9 R, 61.11 D, 61.11 E, 61.12 N, 61.12 M, 61.11 K; 340/149 A, 146.3 B, 173 SS, 173 MA; 221/2; 283/7; 250/569; 178/22

[56] References Cited
UNITED STATES PATENTS

| | | | |
|---|---|---|---|
| 3,245,697 | 4/1966 | Nugent | 283/7 |
| 3,740,530 | 6/1973 | Hoffer | 235/61.7 B |
| 3,764,742 | 10/1973 | Abbott | 178/22 |
| 3,786,420 | 1/1974 | Stambler | 340/149 A |
| 3,793,600 | 2/1974 | Grosbard | 235/61.12 N |
| 3,819,910 | 6/1974 | Scantlin | 235/61.11 E |
| 3,829,661 | 8/1974 | Silverman | 235/61.7 B |
| 3,836,754 | 9/1974 | Toye | 235/61.12 N |

[57] ABSTRACT

An apparatus for determining the identity or authenticity of a document and/or the identity of a user of a document to determine if such person is authorized to do so, and which document is formed as a data carrier, comprising readers for data which can be automatically read and applied to the document. A keyboard or equivalent structure is provided for the infeed of a secret code, such as a number(s), letter(s) or other characters, as is also an evaluation circuit. The evaluation circuit comprises a fixed storage where there can be stored constant data and data processing programs, an access circuit which evaluates parts of the automatically readable data of the document and/or the secret code written in by means of the keyboard in the form of select addresses. A computer which, while using the selected data and processing programs, processes the selected constant data to provide a result, and an indicator for the result, the indicator constituting, for instance, a Yes/No-indicator or multi-character or multi-digit indicator.

5 Claims, 4 Drawing Figures

CHECKING APPARATUS FOR DOCUMENTS

BACKGROUND OF THE INVENTION

The present invention relates to a new and improved construction of checking apparatus for documents for determining the identity or authenticity of the document and/or the identity of a person authorized to use the document.

Checking devices of such general type are employed to prevent the unauthorized use of, for instance, identification papers, contracts, currency, various types of obligations, bonds and other documents employed in transactions between individuals or when such documents are used in automatic installations. In a more restricted sense there are particularly checked with such type devices documents of a nature which exist only once i.e. single-copy documents and such devices enable checking their authenticity and/or the identity of the individual using the documents in order to determine his authority to do so.

In order to automatically check the authenticity of documents there have already been made numerous proposals both as concerns the actual formation of the document itself and also as concerns the checking devices needed to carry out the foregoing authentication and/or identity checking operations. These proposals enable checking a number of documents —for instance bank notes or currency— but, however, do not allow for the positive identification of individual documents out of a group of similar documents.

Heretofore known documents containing individual, automatically readable data —for instance checks provided with a magnetic code or writing— can be easily forged in a manner that it is possible to fool the automatic reader. Additionally, the forms used for the preparation of such documents which, for instance, may have come into the unlawful possession of an individual can be easily inscribed or marked by equipment which is relatively readily available in such a manner that the resultant documents can be neither automatically distinguished or even when visually inspected by other individuals from authentic or real documents.

Automatic equipment, such as for instance automatic banking devices for dispensing cash, are protected against the unlawful use of documents —typically for instance plastic cards— which may have become lost or stolen in that they possess a keyboard or equivalent structure by means of which the user introduces into the system a secret character or number which is only known to the authorized owner or user of the card and compared with information which can be read-off of the document by means of a computer command or instructions. A prerequisite of such type system is that the computer command or instructions, which must be the same for all of the employed plastic cards and all of the automatic systems which are in operation, can be maintained secret, and particularly that the automatic systems can be constructed such that the devices provided within the automatic systems responsible for the computer commands are protected against improper access. A notable drawback of this method is that with modern techniques it is possible, even by using a relatively small number of documents with which there is associated the secret character or number, to determine the computer command or instructions which, for all heretofore known proposed systems always is constituted by a logical derivation, even if the same has a complicated origin.

SUMMARY OF THE INVENTION

Hence, it is a primary object of the present invention to provide a new and improved construction of checking apparatus for documents —which term is used in its broadest sense— and which apparatus is not associated with the aforementioned drawbacks and shortcomings of the prior art proposals.

Another and more specific object of this invention aims at avoiding the aforementioned drawbacks of the heretofore known prior art apparatuses and to provide a particularly advantageous, universally employable apparatus which is capable of checking the identity or authenticity of documents and/or the identity of an individual authorized to use the same.

A further object of the present invention aims at the provision of a new and improved construction of checking apparatus for documents and the like constructed in a manner such that it cannot be easily if at all "fooled".

Now in order to implement these and still further objects of the invention, which will become more readily apparent as the description proceeds, an evaluation circuit of the checking apparatus comprises a fixed or permanent storage in which there are stored constant data and data processing programs, an access circuit which evaluates parts of the automatically readable data of the document and/or the secret character or number introduced via a keyboard or the like as selection or select addresses. There are also provided a computer which, while using the selected data and the data processing programs, processes the selected constant data into a result, and an indicator for indicating the result.

According to further aspects of the invention the checking apparatus contains at least one automatic reader for the determination of data which is characteristic of the document carrier or body of the document even before such document carrier is inscribed or marked with the individual information constituting the document data and distinguishes the same from other document carriers of the same type, typically for instance forms. Such type data will be usually referred to hereinafter as "characteristic data" or "inherent data" of the document. There is further provided at least one reader which detects the so-called document data of the document which is applied to the body of the document of document carrier only during the course of the individual marking thereof while making use of the characteristic data of the document carrier and/or the randomly fixed secret number while taking into account the subsequently carried out automatic evaluation.

In accordance with a still further concept of the invention the characteristic or inherent data which is the property of the document carrier may be constituted by the coincidental or random number and position of fibers, particles, continuous threads incorporated into the material of the document carrier during the course of its fabrication, or by pores, fissures or fringes or equivalent means of one or a number of inserts possessing special physical properties.

According to a further facet of the invention the device for determining the characteristic data of the document carrier or the body of the document, and which device constitutes a part of the checking apparatus, contains a linear or areal mask possessing a multiplicity of measurement zones or regions. These individual measurement zones or regions are separated from one another by insensitive partition webs, strips or equivalent structure possessing a width of one of the particles or pores to be detected, and a circuit for the logical coupling of two successively performed measurement operations while displacing the mask through the width of one web.

According to a further aspect of the invention, the continuous threads or inserts applied to the document carrier are constructed as light conductors by placing in layer configuration on top of one another light pervious material possessing different refractive indices.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE INVENTION

Figure 1:
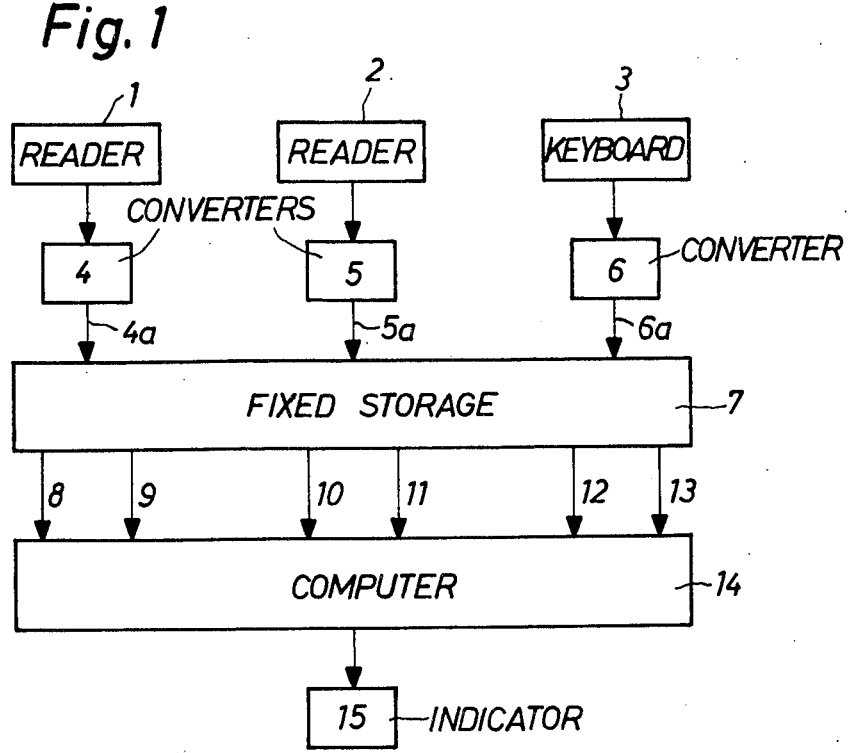
FIG. 1 is a block circuit diagram of a preferred exemplary embodiment of checking apparatus for documents or the like as contemplated by the invention.

Describing now the drawings, in FIG. 1 there is schematically illustrated a block circuit diagram of an exemplary embodiment of checking device as contemplated by the invention. All of the components of this block circuit diagram can be readily constructed without the exercise of invention by utilization of the knowledge presently available in the electronics art. The same is equally true as concerns the mechanical devices needed for the insertion and fixation of a document, and, thus further details thereof are not believed to be necessary. Moreover, it is to be understood that the term "number" whenever used in this description is employed in its broadest sense and is intended to encompass the grouping together of a number of distinguishable characters which need not of necessity be numerals in the normal sense of the usage of such word, but, for instance, could be also letters, or other characters or symbols or appropriate markings. Hence, as a general generic term there will be usually employed the expression "code" or secret number or sometime simply number.

Continuing, a prerequisite of the checking apparatus illustrated by way of example in FIG. 1 is that the documents to be checked must carry certain information or data, the particulars of which will be described more fully hereinafter.

The exemplary embodiment of checking apparatus illustrated in block circuit diagram in FIG. 1 will be understood to encompass a first reading device or reader 1 by means of which it is possible to determine the data which has been conveniently termed the characteristic or inherent data of the document carrier or body of the document, i.e., the data which is placed on each of the document carriers before the actual document data or information particular to any individual document is applied. Further, there is provided a second reading device or reader 2 by means of which there is automatically read the automatically readable data which is additionally applied to the document carrier when filling out the same with the specific information to be contained thereon. The checking apparatus furthermore contains a keyboard 3 or equivalent structure, the term "keyboard" being used in a broad sense to denote by way of example keys, push buttons, or other expedients for the input of a secret number or code which is only known to the authorized user.

Operatively connected in circuit with the aforementioned three devices are converters 4, 5 and 6 which convert the data delivered by the readers 1 and 2 and the keyboard 3 respectively, into non-variable computer instructions or commands. Moreover, these converters 4, 5 and 6 have the function of making available at their outputs 4a, 5a and 6a the converted or transformed data in a form which can be recognized as addresses by the following connected storage or storage means 7.

The storage 7 is a fixed or permanent storage for constant data and for computer commands. It contains constant data snd computer commands in a number which is determined by the number of possible addresses. The number of possible addresses is in turn defined by the informational content of the data delivered by the readers 1 and 2 and the keyboard 3 respectively. In this regard there can be arbitrarily undertaken the division of the storage places with respect to the data and computer commands.

By virtue of the addresses which have been prepared by the converters 4, 5 and 6, the storage 7 delivers by means of its outputs 8, 10 and 12 constant data and by means of its outputs 9, 11 and 13 computer commands or instructions to the computer 14. The computer 14 processes the infed data in accordance with the infed computer commands and finally delivers a result to a suitable indicator device or indicator 15. The indicator 15 can indicate a multi-place or multi-position number or also can only deliver a Yes/No response. Both of these situations are differentiatable from one another also with respect to the fabrication technique of the document which can be checked by the checking apparatuses, as the same will be demonstrated more fully by the explanations to follow.

A decisive difference in contrast to prior art apparatuses resides in the fact that three numbers which have originated independently of one another can be compared with one another, whereas with the heretofore known prior art apparatuses of this type it is always only two numbers, and furthermore, the usual continual logical sequence of the comparison operation carried out with the prior art apparatuses is interrupted through the use of an electronically stored, non-symmetrical, in other words also illogically formed list or sequence. Consequently, with the equipment of this development there is rendered impossible any determination of the computer commands, something possible to determine relatively easy with prior art systems once a person has knowledge of a limited number of documents and the associated secret numbers or codes.

All components or parts of the checking apparatus described in FIG. 1 are identical for all document checking apparatuses of a group. As to the checking apparatuses of this group it is only possible to check a document likewise belonging to the system.

In accordance with the description of the invention the checking apparatus of FIG. 1 can be easily modified for other applications. For instance, it is therefore possible that the addresses produced by the readers 1 and 2 via the converters 4 and 5 only lead to constant data in the storage 7, whereas the characteristic number introduced via the keyboard 3 after processing thereof in the converter 6 serves in the storage 7 as an address for the computer instructions or commands. Of course, it is equally possible to carry out any other combination and use of the addresses.

In those instances of use of the equipment where it is only necessary to check the identity of a document, then there is dispensed with the need for the keyboard 3 or the like and the following circuit devices.

In instances where it is only of importance to determine the authorized possession of a document by an individual, then there can be dispensed with one of both readers 1 and 2 and the associated following circuit devices.

By way of these illustrative examples it is intended to only demonstrate by way of example the multiplicity of possible combinations which can be derived from the teachings of the invention, but in no way are these examples to be considered as exhaustive of all of the various other possible combinations which will readily suggest themselves from the description of the invention to those skilled in the art.

There has already been alluded to above that particular requirements must be placed upon the documents to be checked. Hence, for the use of the reader 1 the document must possess certain digital or digitizible properties which are already inherent to or characteristic of the document carrier, for instance forms or otherwise. These properties are advantageously imparted during fabrication by randomly or also intentionally undertaken measures. An additional protection against reproduction of the document carrier or body of the document can be realized if, for the fabrication or manufacture thereof, there are employed rare materials or difficult to recognize physical properties.

Figure 2:
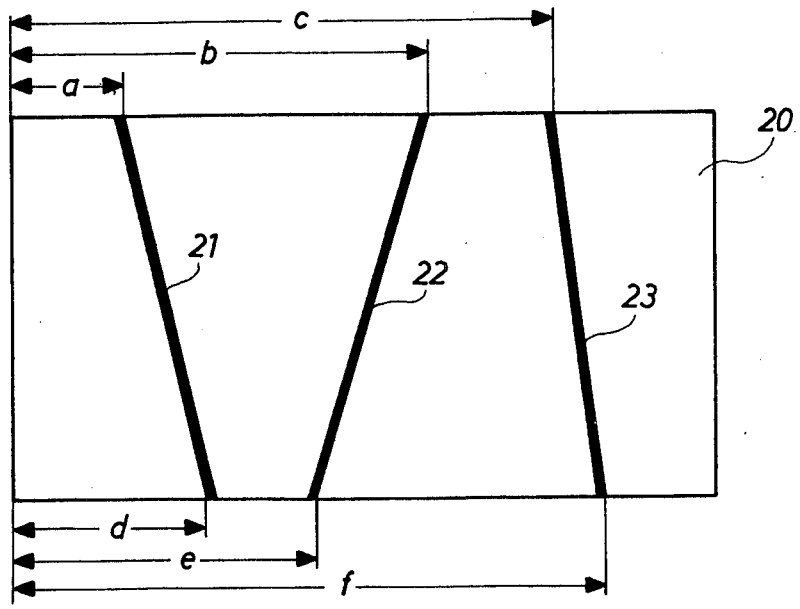
FIG. 2 schematically illustrates a document equipped with security or protection threads or equivalent structure.

An exemplary embodiment of a document carrier or body 20 has been shown in FIG. 2. It is known to protect currency or bank notes against forgery by security or protection threads or the like, which are introduced during the fabrication of the paper. This technique also can be equally applied to foils, with the aid of which, for instance, there are produced identification cards or papers or the like. According to the invention, a document carrier or the body of the document is provided with a number of security threads or the like and with suitable devices there is insured that during fabrication the angular position and the mutual spacing of such security threads alternates or alters, so that in this way document carriers of the same fabrication series differ from one another.

The document carrier or document body 20 illustrated in FIG. 2 contains, for instance, three security threads 21, 22 and 23. The ends of these security threads 21, 22 and 23 are located at a defined or definite spacing or distance $a$, $b$, $c$, $d$, $e$ and $f$ from one narrow side of the document, these distances or also others, for instance relative distances, can be measured and digitized.

The mentioned measurement operation can be carried out easily with conventional means. In order to avoid uncertainty during digitization, there is advantageously employed a measurement device containing a mask 24, as the same has been illustrated in FIG. 3. This mask 24 is subdivided into a multiplicity of measurement regions or zones 25 which are either equipped with a respective measurement element or a measurement element moves in succession thereover. The measurement regions or zones 25 are limited or bounded by non-sensitive or non-responsive partition webs or web means 26 or equivalent structure, the width of which corresponds to the width of the security threads 21, 22 and 23, while taking into account their oblique or inclined position.

With the aid of the measurement device which contains the mask 24 and which itself is a component of the reader or reading device 1 the measurement operation is carried out twice and between the measurement operations the mask 24 is indexed or advanced through the width or one partition or separation web 26. Both of the measurements in a measurement region 25 are logically coupled by means of an OR-circuit or OR-gate and thus there is realized a clear result. With this technique security threads which are situated closer together than a distance corresponding to the width of a partition web are detected as if they did not constitute any security or protection thread.

For the function of the measurement device it is necessary that the security threads are physically distinguishable from their surroundings. This difference, for instance, can exist by virtue of their optical or magnetic properties or also in their galvanic conductivity. A particularly advantageous constructional manifestation of security thread is a light conductor by means of which it is possible to determine, with the aid of a measurement device which can be easily realized with presently available technology existing in the art, the correlation or association of both ends of a security thread, even then if the security threads cross-over or intersect one another. Such type light conductors previously were only known in a circular configuration. For the use thereof in documents there is particularly advantageous a flat configuration of essentially rectangular cross-section, for instance cut-out of appropriate foil combinations. If there is imparted to the core of the light conductor particular transmission properties which can be checked in the checking apparatus, then there is thus rendered more difficult the forgery or copying of document carries.

Figure 4:
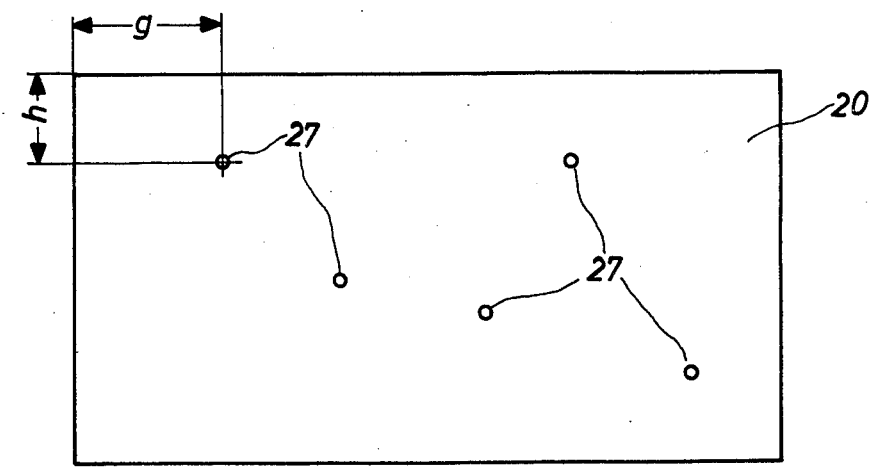
FIG. 4 illustrates a document provided with security or protection particles.

Another form of a document carrier or document body 20 constructed according to the present invention has been illustrated in FIG. 4. It is already known to the art to prepare documents, typically currency or bank notes so as to contain particles, for instance fluorescence fibers which are added to the starting mass, for performing a visual authenticity check. The document carrier 20 of FIG. 4 contains such particles 27, the positional orientation of which is defined by two coordinates $g$ and $h$. In order to measure these coordinates there is advantageously employed a measuring or measurement device as a component of the reader 1 which subdivides the entire surface of the document 20 by a mask into square or rectangular measurement regions or zones which again are separated from one another by partition or separation webs or equivalent structure. With this reader, the detailed illustration of which has been conveniently omitted from the drawings, the measurement operation proceeds exactly in the manner as above described. The webs have a width corresponding to the maximum extent of the particles. There are carried out two measurement operations and the mask is shifted in both coordinates by an amount corresponding to the web width.

Although the described insertion of the particles is particularly advantageous for such documents whose base material or matrix is paper, there can be realized for the construction of documents formed of plastic material, in other words for instance identification cards, a particularly advantageous configuration which more or less is a reversal of the configuration described on the basis of the showing of FIG. 4. To this end there is used for the construction of the document a plastic foil containing a random arrangement of pores, conveniently referred to hereinafter as random pores. These random pores are capable of being easily formed, for instance, with the aid of punching wheels or equivalent structure at a very high repetition rate or also by means of a sprayed-on solvent or similar chemical or physical processes. From a combination of such foils it is possible to realize numerous evaluation possibilities. Thus, for instance, when using two different colored foils there are realized pores of the one as well as of the other color which can be differently evaluated by virtue of the digitization.

Figure 3:
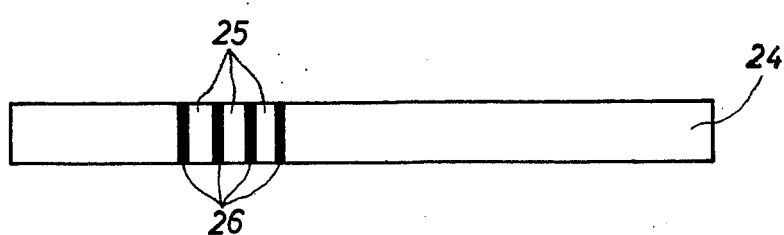
FIG. 3 illustrates a mask for the determination of the characteristic or inherent data of the document carrier or body of the document.

Similar possibilities are realized for linear evaluation techniques according to FIG. 3 if the employed foils possess fringes or the like which, for instance, are produced in that at the marginal zones of the foils which are to be cut during a subsequent time period there can be applied large pores of holes in a dense sequence.

Just as was the case when using light conductors, when using foils it is advantageous in the measurement device to resort to the use of the illumination emanating from the edges of the document, in other words, to resort to the use of the floodlight effect. This floodlight effect is augmented if the foils containing the pores are embedded between foils having a lower refractive index.

Apart from the data which is the characteristic or inherent property of the document carrier and which can be detected by the reader 1, there are required for the use of the checking apparatus of FIG. 1 also the readable information to be applied during the individual marking of the document and a secret number, and which together with the characteristic information of the document carrier must produce a predetermined result in the checking apparatus of FIG. 1.

If, during the subsequent evaluation, there is displayed or indicated the result at the indicator 15 in the form of a multiplace number, then both the information to be read at the reader 2 as well as the secret number can be freely selected. It is thus possible, for instance, to use the information which is to be read by the reader 2 and applied in a simple to produce code which can be automatically read with extreme security for portraying the surname of the proper user or authorized owner of the document and thereby render possible an additional checking operation as concerns the authority of the person using the document. It is furthermore possible to accommodate the secret number to the wishes of the authorized user or owner so that he or she can particularly easily remember the same. The thus prepared document, for the final fabrication thereof, is inserted into a checking apparatus of the type illustrated in FIG. 1, there is introduced the secret number and the number displayed at the indicator 15 is for instance, manually noted upon the document carrier. Now the fabrication of the document is completed.

On the other hand, if during checking in the checking apparatus of FIG. 1, the indicator 15 only should display or deliver a Yes/No answer or value, then, at least one of both values introduced by means of the reader 2 or the keyboard 3 must be detected by a positive or mandatory operation. If, for instance, the secret number is randomly selected, then for the calculation of the information to be inscribed there is used for the reader 2 a device which is realized in that for the checking apparatus illustrated in FIG. 1 the reader 2 is replaced by a random number generator which produces all permissible numbers in a timewise sequence. After insertion of the document and introduction of the secret number or code at the keyboard 3 this random number generator is placed in operation and at the same time that the information "Yes" is displayed at the indicator 15 is brought to standstill. The number which is present at that point of time in the random number generator is then transferred to the document in a form which can be read by the reader or reading device 2.

While there is shown and described present preferred embodiments of the invention, it is to be distinctly understood that the invention is not limited thereto, but may be otherwise variously embodied and practiced within the scope of the following claims. Accordingly,

What is claimed is:

1. An apparatus for the selective determination of at least any one of the identity of a document formed as a data carrier, the identity of the proper user of the document, or both, comprising reading devices for automatically reading automatically readable data applied to the document, keyboard means for the infeed of a secret number, an evaluation circuit, said evaluation circuit possessing fixed storage means in which there are stored constant data and data processing programs, access circuit means for selectively evaluation any one of parts of the automatically readable data of the document, the secret number introduced via the keyboard means, or both, in the form of select addresses, computer means which through utilization of the selected constant data and data processing programs processes the selected constant data into a result, and means for the indication of said result, the improvement wherein the document embodies a document carrier containing characteristic data, one of the reading devices serves for the determination of the characteristic data of the document carrier and includes a mask possessing a number of measurement regions, the individual measurement regions are separated from one another by non-sensitive partition webs of a width essentially corresponding to at least one means incorporated into the document carrier, and circuit means for logically coupling two successively carried out measurement operations while displacing the mask through a distance corresponding to the width of a web.

2. The apparatus as defined in claim 1, wherein said mask comprises a substantially linear mask.

3. The apparatus as defined in claim 1, wherein said mask comprises a substantially areal mask.

4. The apparatus as defined in claim 1, wherein the means incorporated into the document carrier comprises particles.

5. The apparatus as defined in claim 1, wherein the means incorporated into the document carrier comprises pores.

* * * * *

UNITED STATES PATENT OFFICE
CERTIFICATE OF CORRECTION

Patent No. 4,025,759   Dated May 24, 1977

Inventor(s) Kurt M. Scheffel

It is certified that error appears in the above-identified patent and that said Letters Patent are hereby corrected as shown below:

Col 2, Line 50; change " of " to read --- or ---

Col. 3, Line 54; change " number " to read --- "number"---

Col. 3, Line 55; change " number " to read --- "number"---

Col. 4, Line 25; change "snd" to read --- and ---

Col. 8, Line 39; change "evaluation" to read --- evaluating---

Signed and Sealed this

Fourth Day of October 1977

[SEAL]

Attest:

RUTH C. MASON  
*Attesting Officer*

LUTRELLE F. PARKER  
*Acting Commissioner of Patents and Trademark*